(12) United States Patent
Holzberger et al.

(10) Patent No.: US 10,377,201 B2
(45) Date of Patent: Aug. 13, 2019

(54) ELASTOMER COUPLING AND ASSOCIATED ROLL STABILIZER

(71) Applicant: Schaeffler Technologies AG & Co. KG, Herzogenaurach (DE)

(72) Inventors: Markus Holzberger, Emskirchen (DE); Wilfried Breton, Altdorf (DE); Ramon Jurjanz, Erlangen (DE); Manuel Seubert, Eckental (DE); Sebastian Kruger, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 204 days.

(21) Appl. No.: 15/524,464

(22) PCT Filed: Nov. 4, 2015

(86) PCT No.: PCT/DE2015/200490
§ 371 (c)(1),
(2) Date: May 4, 2017

(87) PCT Pub. No.: WO2016/074674
PCT Pub. Date: May 19, 2016

(65) Prior Publication Data
US 2018/0272822 A1    Sep. 27, 2018

(30) Foreign Application Priority Data

Nov. 12, 2014   (DE) .................. 10 2014 223 076

(51) Int. Cl.
*B60G 11/60* (2006.01)
*B60G 21/055* (2006.01)
*F16D 3/68* (2006.01)
*F16F 1/48* (2006.01)
(Continued)

(52) U.S. Cl.
CPC .......... *B60G 11/60* (2013.01); *B60G 21/0555* (2013.01); *F16D 3/68* (2013.01);
(Continued)

(58) Field of Classification Search
CPC ....... B60G 11/60; B60G 21/0555; F16F 1/48; F16F 15/085; F16F 1/54
See application file for complete search history.

(56) References Cited

U.S. PATENT DOCUMENTS

| 2,806,365 A | 9/1957 | Hennig |
|---|---|---|
| 8,376,649 B2 | 2/2013 | Heinrich et al. |

(Continued)

FOREIGN PATENT DOCUMENTS

| DE | 594772 | 4/1934 |
|---|---|---|
| DE | 6944914 | 3/1973 |

(Continued)

*Primary Examiner* — Nicole T Verley

(74) *Attorney, Agent, or Firm* — Volpe and Koenig, P.C.

(57) ABSTRACT

An elastomer coupling for an electromechanical actuator, having a drive part and a driven part, wherein either the drive part or the driven part has multiple radially outwardly extending webs arranged so as to be distributed about an axis of rotation, and the respective other part has radially inwardly extending webs arranged on the inner side of a tubular body, wherein a radially inwardly and a radially outwardly extending web engage into one another and form a pocket in which there is received an elastic molded body produced from an elastomer, wherein, in at least one pocket, there is received a spring element which generates a pre-tensioning force, which spring element is attached either to an inwardly extending or to an outwardly extending web and is spring-loaded against an adjacent web.

20 Claims, 3 Drawing Sheets

(51) Int. Cl.
*F16F 1/54* (2006.01)
*F16D 3/66* (2006.01)
*F16F 3/10* (2006.01)
*F16F 15/08* (2006.01)

(52) U.S. Cl.
CPC .................. *F16F 1/48* (2013.01); *F16F 1/54* (2013.01); *B60G 2202/144* (2013.01); *B60G 2202/442* (2013.01); *B60G 2204/4108* (2013.01); *B60G 2204/42* (2013.01); *B60G 2206/427* (2013.01); *F16D 3/66* (2013.01); *F16F 3/10* (2013.01); *F16F 15/085* (2013.01); *F16F 2224/0208* (2013.01)

(56) References Cited

U.S. PATENT DOCUMENTS

| | | | | |
|---|---|---|---|---|
| 8,690,174 B2 * | 4/2014 | Grau | .................. | B60G 21/0555 280/124.103 |
| 9,393,848 B2 * | 7/2016 | Mohrlock | .............. | B60G 11/48 |
| 9,416,849 B2 * | 8/2016 | Park | .......................... | F16H 1/28 |
| 2010/0187778 A1 * | 7/2010 | Grau | .................. | B60G 21/0555 280/5.508 |
| 2015/0151604 A1 * | 6/2015 | Park | .......................... | F16H 1/28 280/124.106 |

FOREIGN PATENT DOCUMENTS

| | | | | |
|---|---|---|---|---|
| DE | 69624190 | | 2/2003 | |
| DE | 102006048653 | | 5/2007 | |
| DE | 102011052275 | | 3/2012 | |
| DE | 102014223706 A1 * | | 5/2016 | ............. B60G 11/60 |
| DE | 102017109137 A1 * | | 10/2018 | ............. B60G 11/60 |
| EP | 1886850 A1 * | | 2/2008 | ........... B60G 21/051 |
| EP | 2213489 | | 8/2010 | |
| WO | 9411646 A1 | | 5/1994 | |
| WO | 0131216 | | 5/2001 | |

\* cited by examiner

ELASTOMER COUPLING AND ASSOCIATED ROLL STABILIZER

BACKGROUND

The invention relates to an elastomer coupling for an electromechanical actuator with a drive part and a driven part, wherein either the drive part or the driven part has multiple webs that are arranged distributed about a rotational axis and extend radially outward and the other part has webs that are arranged on the inner side of a tubular body and extend radially inward, wherein a web extending radially inward and a web extending radially outward engage in each other and form a pocket in which an elastic molded body made from an elastomer is held.

An elastomer coupling is part of a roll stabilizer for a motor vehicle, wherein an active roll stabilizer can be installed on a front axle or on a rear axle of a motor vehicle. An electromechanical roll stabilizer comprises an electric motor, a control unit, a multi-step planetary gear, and an elastomer coupling that is part of an elastomer decoupling unit (EKE) and decouples the actuator from effects due to unevenness in the roadway during straightaway driving. Small amounts of torsion between torsion bars are absorbed by molded bodies made from an elastomer.

A roll stabilizer with an elastomer coupling is known from EP 2 213 489 A1. A drive part is here formed as an inner star body and a driven part is formed as an outer star body; a molded body made from an elastomer is held between the inner and outer webs that engage with each other. In this way, a certain desired profile of the torque over the rotational angle between the drive part and the driven part or between the two torsion bars of the roll stabilizer is produced. The active roll stabilizer exhibits high elasticity for small torques or torsional moments. Here, relative movements between the drive part and the driven part are possible through deformation of the molded body without transmitting a significant torque. Starting from a certain rotational angle, however, the transmitted torque increases progressively. For continued deformation of the molded body, a progressive increase in stiffness occurs. Thus, small rotations of the torsion bars of the stabilizer produced, e.g., by roadway unevenness, can be absorbed by the molded bodies, which increases driving comfort. When driving around a curve and also for different roadway unevenness between the right and the left side, the rolling motion of the vehicle can be reduced by active rotation of the two stabilizer halves by the roll stabilizer.

FIGS. 1-3 show components of an elastomer coupling developed by the applicant. FIG. 1 shows a drive part 1 with an inner star body 2 whose webs 3 have molded bodies 4, 5 molded on both sides. FIG. 2 shows a driven part 6 that is formed as an outer star body and has recesses adapted to the inner star body 2 and with a mirror-inverted shape. Clearances that allow the molded bodies 4, 5 to deform under loading are formed between the inner star body 2 and the outer star body. In the assembled state, the inner star body is inserted into the outer star body, wherein the elastomer coupling is formed that is suitable for transmitting a torsional moment.

FIG. 3 is an enlarged, section view of a web 2 of the inner star body shown in FIG. 1. The web 2 produced from a steel alloy has the molded bodies 4, 5 molded on both sides. Up to a certain rolling angle, the elastomer coupling has a soft response, that is, the slope in the stiffness characteristic curve is small. When a limit angle is reached, the molded body made from the elastomer is held completely in a recess between the inner star body and the outer star body and has an incompressible response. When this limit angle is exceeded, the elastomer coupling has a stiff response, that is, the stiffness characteristic curve has a large slope. This bilinear response of the elastomer coupling thus reduces, especially when driving on rough roadways, the number of necessary control actions of the roll stabilizer. Thus, the drive motor of the roll stabilizer is quasi decoupled from movements of the torsion bars due to the soft characteristic curve of the elastomer coupling.

For the functional principle of this known elastomer coupling, the elastomer material molded on the inner star body takes over the function of a spring that is loaded predominately into compression under torsional loading. Such an elastomer coupling can be understood as a parallel circuit, e.g., of five springs of equal stiffness that are loaded to the block position under loading.

For conventional elastomer couplings, the problem can occur that the elastic molded bodies that can be arranged either loosely in the pockets or can be molded on a web exhibit subsidence. This means that the elastic molded bodies produced from elastomer are permanently deformed after some time by the loads that occur, so that play can occur between the drive part and the driven part, more precisely between the inner star body and the outer star body. In this state, if there is no pretensioning between the two components of the elastomer coupling that can move relative to each other, undesired acoustic emissions can be produced.

SUMMARY

Therefore, the invention is based on the object of providing an elastomer coupling in which a pretensioning between the drive part and the driven part is permanently present.

To achieve this object, for an elastomer coupling of the type mentioned above, it is provided according to the invention that a spring element generating pretensioning is held in at least one pocket, wherein this spring element is attached either to a web extending inward or to a web extending outward and is spring mounted against an adjacent web.

The at least one spring element of the elastomer coupling according to the invention generates the desired pretensioning between the drive part and the driven part. For this purpose, the spring element is attached to a web and extends tangentially over a pocket up to the adjacent web, forming a spring-like contact with this web. If the spring element is attached to a web of the inner star body, it contacts one or two adjacent webs of the outer star body. If the spring element is attached to a web of the outer star body, it contacts one or two adjacent webs of the inner star body. In this way, a pretensioning between the inner star body and the outer star body and thus between the driven part and the drive part is generated. By selecting a suitable material, a suitable shape, and thickness, the spring element is dimensioned so that it maintains the pretensioning during the entire service life of the elastomer coupling according to the invention. Even if the elastic molded bodies produced from elastomer exhibit settling over time, the pretensioning can be generated permanently by the spring element.

The elastomer coupling according to the invention has at least one such spring element, but multiple, e.g., two or three, spring elements could also be provided. It is even conceivable that the spring element extends only over a part of the length of a web in the axial direction, so that a web has both a molded elastomer body and also a spring element. With respect to an economical production, however, it is preferred that the elastomer coupling has exactly one such spring element and that elastomer molded bodies are arranged in the remaining pockets.

For the elastomer coupling according to the invention, it is preferred that the spring element is spring mounted against two adjacent webs. Starting from an imaginary middle line of the web on which the spring element is attached, the spring element thus extends in two tangential directions and is spring mounted against the two adjacent webs. A spring element attached to the inner star body is thus spring mounted against two webs of the outer star body and vice versa. Preferably the spring element is formed symmetric to the mentioned imaginary center line of the allocated web.

An especially simple and nevertheless reliable connection between the spring element and the web holding this element is produced if the spring element is placed on the web. For this purpose, the web having the spring element can have, on its free end, a recess in which the spring element is held with a positive and/or non-positive locking connection. The recess can be formed, for example, as a groove that has a U-shaped or a semicircular cross section. The groove can also be constructed as an undercut groove. The spring element is shaped accordingly, so that it is inserted into the recess or groove and is held there reliably.

In another construction of the invention, it can be provided that the spring element has at least one convex curved part. The spring element thus has an outwardly curving section that contacts an adjacent web and thus fixes its position.

An alternative construction of the elastomer coupling according to the invention provides that the spring element has a convex curved part and a concave curved part that transition continuously into each other. Between the two curved parts there is an inflection point. Both designs are equally suitable for generating the necessary pretensioning force.

The spring element of the elastomer coupling according to the invention is preferably produced from a spring steel material.

In addition, the invention relates to a roll stabilizer that can be connected or is connected to torsion bars of a divided stabilizer and has an electromechanical actuator with a drive part and a driven part between which there is an elastomer coupling of the described type.

BRIEF DESCRIPTION OF THE DRAWINGS

Additional advantages and details of the invention are explained below using embodiments with reference to the drawings. The drawings are schematic representations and show.

DETAILED DESCRIPTION OF THE PREFERRED EMBODIMENTS

Figure 1:
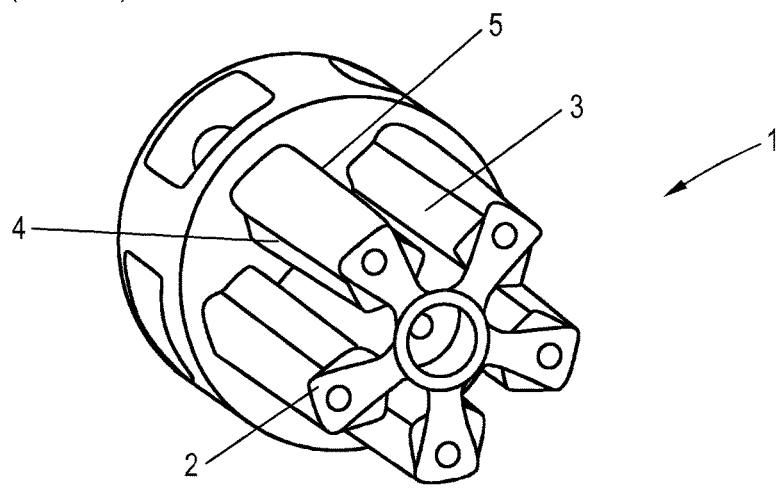
FIG. 1 a perspective view of a drive part with an outer star body of a conventional elastomer coupling, FIG. 2 a perspective view of a driven part with an inner star body of a conventional elastomer coupling, FIG. 3 a section view of the outer star body shown in FIG. 1, FIG. 4 a section view of a first embodiment of an elastomer coupling according to the invention, and FIG. 5 a section view of a second embodiment of an elastomer coupling according to the invention.
Figure 2:
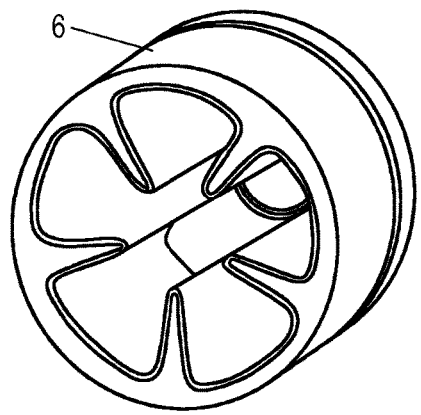
Figure 3:
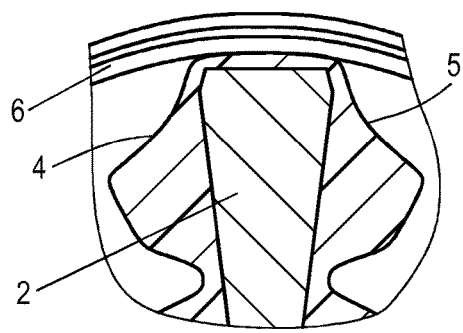

The elastomer coupling 7 comprises an outer star body 9 connected to a drive part and an inner star body 10 connected to a driven part. In the illustrated embodiment, the inner star body 10 has a total of five webs 11 that are distributed about the circumference and are each spaced apart from each other. However, modified designs are also conceivable in which, e.g., four or six webs distributed about the circumference are provided.

Between adjacent webs 11 of the inner star body 10, webs 12 of the outer star body 9 extend. Each web 12 has, on both sides, an elastic molded body 13, 14 produced from an elastomer by which a pocket 15 formed between a web 12 of the outer star body 9 and a web 11 of the inner star body 10 is filled up. The molded bodies 13, 14 are molded onto both sides of the webs 12. The molded bodies 13, 14 are made from an elastomer, for example, made from natural rubber, nitrile rubber, or HNBR, which exhibits a viscoelastic behavior. If the elastomer coupling 7 is loaded by a torsional moment generated from the outside, for example, driving over a roadway with unevenness, initially the elastic molded bodies 13, 14 are deformed until clearances are practically completely filled up in the pockets 15. Only for further increase in the torsional moment is this transmitted via the elastomer coupling 7.

Because the molded bodies 13, 14 can exhibit subsidence during the operating time, a web 16 of the outer star body 9 has a different construction than the webs 12. The web 16 has, on its free end, a recess 17 in which a spring element 18 is held. The spring element 18 has a symmetric shape with respect to an imaginary center line of the web 16 and has a U-shaped, bent middle section with which it is inserted into the recess 17 of the web 16 with a mirror-inverted form. Starting from the middle section, the spring element 18 has, on both sides, a convex curved part 19 that is spring mounted against the adjacent webs 11 of the inner star body 10. The free end 20 of the spring element 18 contacts the base 21 of the web 16. The spring element 18 generates a permanent pretensioning force between the inner star body 10 and the outer star body 9. If the elastomer coupling 7 is loaded during the operation by a torsional moment, the spring element 18 deforms elastically; when the torsional moment is no longer active, the spring element 18 moves back into its original position shown in FIG. 4. Even if the molded bodies 13, 14 settle during the service life, the spring element 18 guarantees that a pretensioning force is always present. In this way, undesired contacts between the webs 11, 12 are prevented, which otherwise could lead to acoustic emissions.

Figure 4:
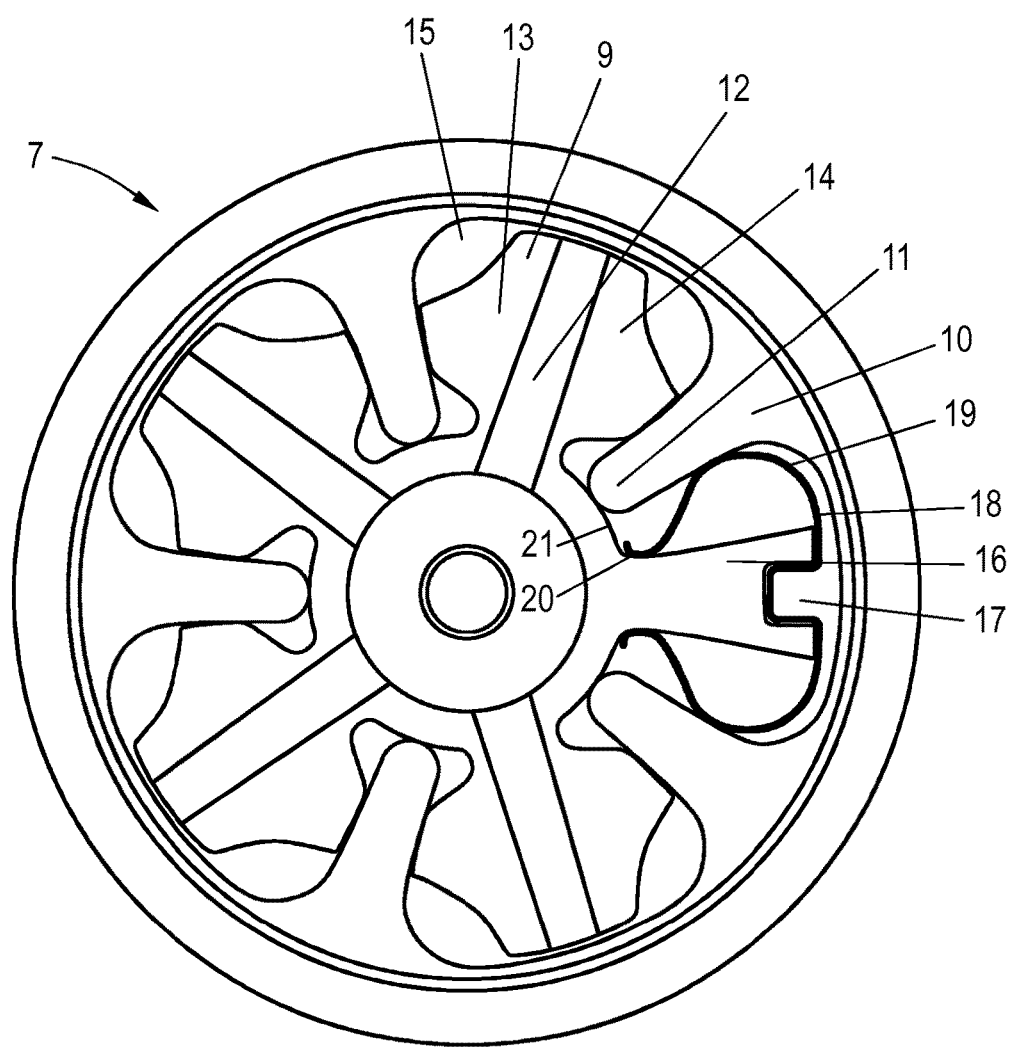
FIG. 4 is a section view of an elastomer coupling 7 whose basic construction corresponds to the conventional elastomer coupling shown in FIGS. 1 to 3. Therefore, detailed explanations for matching components will not be repeated.
Figure 5:
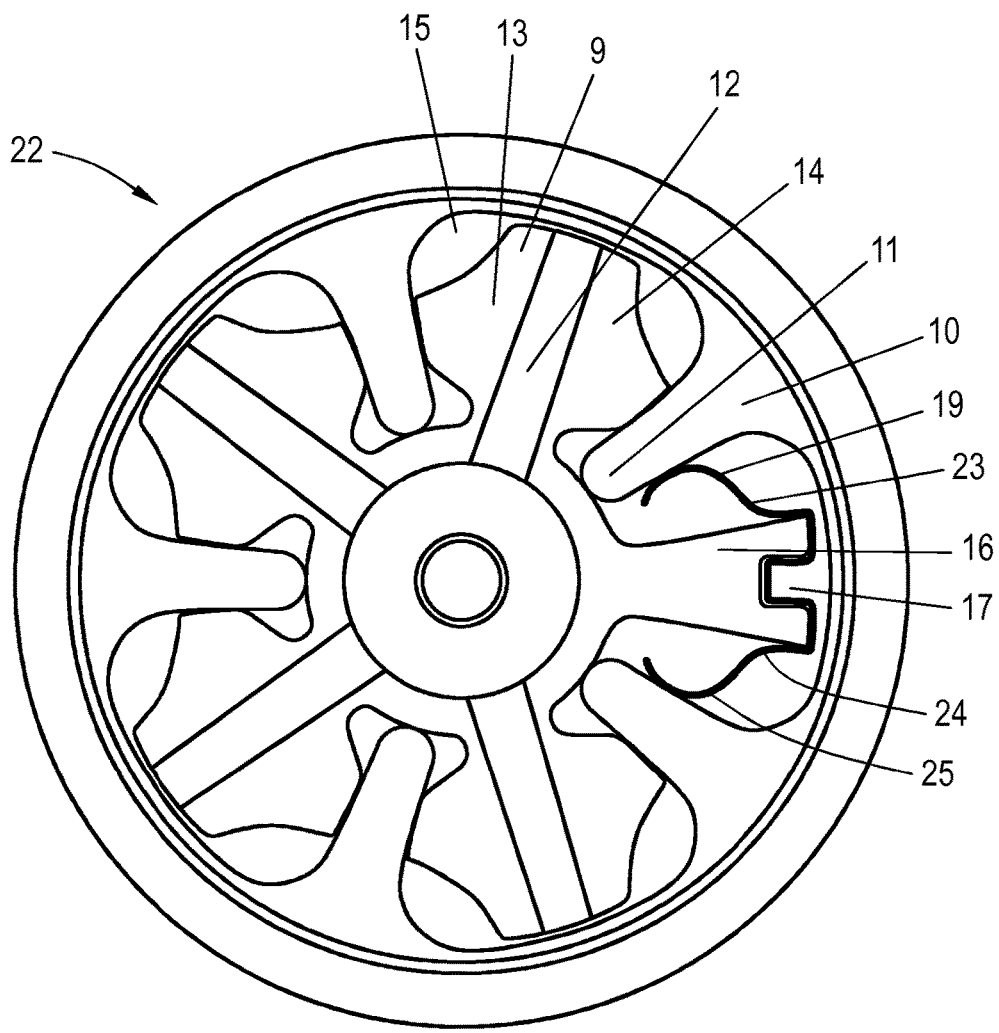

FIG. 5 is a section view and shows a second embodiment of an elastomer coupling 22 that is constructed basically like the elastomer coupling 7 shown in FIG. 4.

The elastomer coupling 22 has, in agreement with the preceding embodiment, the inner star body 10 with the webs 11 and the outer star body 9 with the webs 12 and the web 16.

On the web 16, a spring element 23 is placed that has a symmetric construction and has, starting from its middle section, a concave curved part 24 and a convex curved part 25 connecting continuously to the concave curved part. The outer curved parts 25 are spring mounted against the adjacent webs 11 of the inner star body 10. The spring element 23 shown in FIG. 5 can alternatively be used for the spring element 18 shown in FIG. 4. The two spring elements 18, 23 produced from a spring steel material extend in the axial direction along the web 16. The generated pretensioning can be influenced by a change of the shape, the thickness, and the length, as well as of the material being used.

LIST OF REFERENCE NUMBERS

1 Drive part
2 Inner star body
3 Web
4 Molded body
5 Molded body
6 Driven part
7 Elastomer coupling
9 Outer star body
10 Inner star body
11 Web
12 Web
13 Molded body
14 Molded body
15 Pocket
16 Web
17 Recess
18 Spring element
19 Curved part
20 End
21 Foot
22 Elastomer coupling
23 Spring element
24 Curved part
25 Curved part

The invention claimed is:

1. An elastomer coupling for an electromechanical actuator, comprising:
a drive part and a driven part,
one of the drive part or the driven part has multiple webs that are arranged distributed about a rotational axis and extend radially outward and the other of the drive part or the driven part has webs that are arranged on an inner side of a tubular body and extend radially inward,
radially inward extending ones of the webs and radially outward extending one of the webs engage with each other and form pockets in at least a respective one of which an elastic molded body produced from an elastomer is held,
in at least one of the pockets, a spring element generating a pretensioning force is attached to one of the radially inward extending webs or to one of the radially outward extending webs and is spring mounted against an adjacent one of the webs.

2. The elastomer coupling according to claim 1, wherein the spring element is spring-mounted against both of the adjacent webs.

3. The elastomer coupling according to claim 1, wherein the spring element is placed on one of the webs.

4. The elastomer coupling according to claim 3, wherein the web having the spring element has on a free end thereof a recess in which the spring element is held in a positive or non-positive locking connection.

5. The elastomer coupling according to claim 1, wherein the spring element extends axially at least across one part of a length of the web on which it is arranged.

6. The elastomer coupling according to claim 1, wherein the spring element is produced from a spring steel material.

7. A roll stabilizer that is connectable to torsion bars of a split stabilizer and has an electromechanical actuator with a drive part and a driven part between which an elastomer coupling according to claim 1 is arranged.

8. The elastomer coupling according to claim 1, wherein the spring element contacts opposing circumferential faces of the one of the radially inward extending webs or the one of the radially outward extending webs.

9. An elastomer coupling for an electromechanical actuator, comprising a drive part and a driven part, one of the drive part or the driven part has multiple webs that are arranged distributed about a rotational axis and extend radially outward and the other of the drive part or the driven part has webs that are arranged on an inner side of a tubular body and extend radially inward, radially inward extending ones of the webs and radially outward extending one of the webs engage with each other and form pockets in at least a respective one of which an elastic molded body produced from an elastomer is held, in at least one of the pockets, a spring element generating a pretensioning force is attached to one of the radially inward extending webs or to one of the radially outward extending webs and is spring mounted against an adjacent one of the webs, wherein the spring element has at least one convex curved part.

10. The elastomer coupling according to claim 9, wherein the spring element is spring-mounted against both of the adjacent webs.

11. The elastomer coupling according to claim 9, wherein the spring element is placed on one of the webs.

12. The elastomer coupling according to claim 11, wherein the web having the spring element has on a free end thereof a recess in which the spring element is held in a positive or non-positive locking connection.

13. The elastomer coupling according to claim 9, wherein the spring element extends axially at least across one part of a length of the web on which it is arranged.

14. A roll stabilizer that is connectable to torsion bars of a split stabilizer and has an electromechanical actuator with a drive part and a driven part between which an elastomer coupling according to claim 9 is arranged.

15. An elastomer coupling for an electromechanical actuator, comprising a drive part and a driven part, one of the drive part or the driven part has multiple webs that are arranged distributed about a rotational axis and extend radially outward and the other of the drive part or the driven part has webs that are arranged on an inner side of a tubular body and extend radially inward, radially inward extending ones of the webs and radially outward extending one of the webs engage with each other and form pockets in at least a respective one of which an elastic molded body produced from an elastomer is held, in at least one of the pockets, a spring element generating a pretensioning force is attached to one of the radially inward extending webs or to one of the radially outward extending webs and is spring mounted against an adjacent one of the webs, wherein the spring element has a convex curved part and a concave curved part that transition continuously into each other.

16. The elastomer coupling according to claim 15, wherein the spring element is spring-mounted against both of the adjacent webs.

17. The elastomer coupling according to claim 15, wherein the spring element is placed on one of the webs.

18. The elastomer coupling according to claim 17, wherein the web having the spring element has on a free end thereof a recess in which the spring element is held in a positive or non-positive locking connection.

19. The elastomer coupling according to claim 15, wherein the spring element extends axially at least across one part of a length of the web on which it is arranged.

20. A roll stabilizer that is connectable to torsion bars of a split stabilizer and has an electromechanical actuator with a drive part and a driven part between which an elastomer coupling according to claim 15 is arranged.

\* \* \* \* \*